(12) United States Patent
Kim

(10) Patent No.: US 7,926,869 B2
(45) Date of Patent: Apr. 19, 2011

(54) REAR BODY STRUCTURE OF VEHICLE

(75) Inventor: Yong Kew Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 152 days.

(21) Appl. No.: 12/332,829

(22) Filed: Dec. 11, 2008

(65) Prior Publication Data
US 2010/0032229 A1    Feb. 11, 2010

(30) Foreign Application Priority Data

Aug. 6, 2008  (KR) ........................ 10-2008-0077075

(51) Int. Cl.
*B62D 21/02* (2006.01)

(52) U.S. Cl. .............. 296/187.11; 296/193.08; 296/198; 180/312

(58) Field of Classification Search ............. 296/193.08, 296/203.01, 203.03, 203.04, 187.01, 187.08, 296/198, 187.11; 180/312
See application file for complete search history.

(56) References Cited

U.S. PATENT DOCUMENTS

| | | | | |
|---|---|---|---|---|
| 4,213,398 A | * | 7/1980 | Di Rosa | 105/150 |
| 4,408,794 A | * | 10/1983 | Harasaki | 296/198 |
| 5,013,063 A | * | 5/1991 | Mitchell | 280/124.162 |
| 5,015,004 A | * | 5/1991 | Mitchell | 280/81.6 |
| 5,305,858 A | * | 4/1994 | Haga et al. | 188/271 |
| 5,431,363 A | * | 7/1995 | Ezzat et al. | 248/205.1 |
| 5,580,121 A | * | 12/1996 | Dange et al. | 296/181.4 |
| 6,241,266 B1 | * | 6/2001 | Smith et al. | 280/124.116 |
| 6,648,401 B2 | * | 11/2003 | Behnke et al. | 296/198 |
| 6,830,287 B1 | * | 12/2004 | Aghssa et al. | 296/187.11 |
| 7,021,703 B2 | * | 4/2006 | Yamaguchi et al. | 296/203.04 |
| 7,083,225 B2 | * | 8/2006 | Yakata et al. | 296/203.04 |
| 7,281,756 B2 | * | 10/2007 | Fukushi et al. | 296/203.04 |
| 2002/0084614 A1 | * | 7/2002 | Chun | 280/124.147 |
| 2004/0217604 A1 | * | 11/2004 | Ledford et al. | 293/102 |
| 2004/0222693 A1 | * | 11/2004 | Toyoda | 301/110.5 |

FOREIGN PATENT DOCUMENTS

| | | |
|---|---|---|
| JP | 9-220917 A | 8/1997 |
| JP | 2000-168613 A | 6/2000 |
| JP | 2006-182081 A | 7/2006 |
| KR | 1020060071799 A | 6/2006 |
| KR | 10-0643961 B1 | 11/2006 |
| KR | 10-0844723 B1 | 7/2008 |

* cited by examiner

*Primary Examiner* — Glenn Dayoan
*Assistant Examiner* — Pinel E Romain
(74) *Attorney, Agent, or Firm* — Morgan, Lewis & Bockius LLP

(57) ABSTRACT

A rear body structure of a vehicle includes a wheel housing inner panel, and a common mounting bracket which is engaged with an outer surface of the wheel housing inner panel in a forward/backward direction of the car body and has insertion holes formed therein such that a two-wheel shock absorber and a four-wheel shock absorber are inserted into the holes, respectively, and an inner quarter connecting member which connects the common mounting bracket to an inner quarter panel to reinforce a rigidity of the bracket. Accordingly, a single common mounting bracket can be applied to a two-wheel drive system and a four-wheel drive system, without the need of separately manufacturing and assembling a bracket for a two-wheel shock absorber and a bracket for a four-wheel shock absorber, and thus the manufacturing cost of the rear body structure can be reduced. Also, since the common mounting bracket, which is commonly applied to the two-wheel drive system and the four-wheel drive system, is fixed to the wheel housing inner panel, in formation of the structure for improving the rigidity of the car body through connection of the common mounting bracket to the inner quarter panel, it is not required to differentiate depending on whether the system is the two-wheel drive system or the four-wheel drive system. Thus, it is possible to provide a very effective structure for improving the rigidity of the car body.

7 Claims, 6 Drawing Sheets

REAR BODY STRUCTURE OF VEHICLE

CROSS-REFERENCE TO RELATED APPLICATION

This application is based on and claims priority from Korean Patent Application No. 10-2008-77075, filed on Aug. 6, 2008, the entire contents of which application is incorporated herein for all purposes by this reference.

BACKGROUND OF THE INVENTION

1. Field of the Invention

The present invention relates to a rear body structure of a vehicle, and more particularly to a rear body structure of a vehicle including a common mounting bracket that can be used, without the need of separately manufacturing a mounting bracket for a two-wheel shock absorber and a mounting bracket, for a four-wheel shock absorber, and thus can enhance a rigidity of a car body through connection of the common mounting bracket to an inner quarter panel.

2. Description of Related Art

A rear body structure of a conventional vehicle includes, as shown in FIG. 1, a wheel housing inner panel 110 within which a rear wheel is mounted, an inner quarter panel 150 connected to the wheel housing inner panel 110, and a rear floor member 173 connected to the wheel housing inner panel 110.

Mounted to an outer surface of the wheel housing inner panel 110 is a mounting bracket 120 for a two-wheel shock absorber or a mounting bracket 127 for a four-wheel shock absorber having insertion holes 121 and 125 into which a two-wheel shock absorber 122 or a four-wheel shock absorber 124 is inserted.

The two-wheel shock absorber 122 and the four-wheel shock absorber 124 are inserted into the insertion holes 121 and 125, and then fastened by bolt to the mounting bracket 120 for the two-wheel shock absorber and the mounting bracket 127 for the four-wheel shock absorber, respectively.

However, according to the conventional rear body structure, the mounting bracket 120 for the two-wheel shock absorber or the mounting bracket 127 for the four-wheel shock absorber is constituted in a structure which is not connected to the inner quarter panel 150, but is assembled solely to the wheel housing inner panel 110. Therefore, there exists a problem that, when a mounting part of the two-wheel shock absorber 122 or the four-wheel shock absorber 124 is subjected to vibration, such vibration is not absorbed particularly well in the area indicated as "M" in FIG. 1, where vibration isolation is weak and noise and vibration are introduced into the passenger compartment of the vehicle.

On the other hand, the conventional rear body structure is constituted such that, as shown in FIG. 2, the mounting bracket 120 for the two-wheel shock absorber is mounted at a position (a) in case of a two-wheel drive system whereas the mounting bracket 127 for the four-wheel shock absorber is mounted at a position (b) in case of a four-wheel drive system.

As described above, in case of the two-wheel drive system and the four-wheel drive system, the mounting brackets 120 and 127, to which the two-wheel shock absorber 122 and the four-wheel shock absorber 124 are mounted, are respectively and separately manufactured, and the positions where the shock absorbers 122 and 124 are mounted are different from each other. Thus, there are limitations in constructing the structure for reinforcing the rigidity of the whole car body.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Accordingly, various aspects of the present invention has developed to overcome the above-mentioned problems while maintaining certain advantages of conventional rear body structures.

Various aspects of the present invention provide for a rear body structure of a vehicle wherein the two-wheel shock absorber or the four-wheel shock absorber can be connected to an inner quarter panel, and thus it is possible to prevent noise and vibration from being introduced into a room of the vehicle by absorbing the vibration with the inner quarter panel when shock is applied to the two-wheel shock absorber or the four-wheel shock absorber.

Various aspects of the present invention provide for a rear body structure of a vehicle having an improved construction that can reinforce the rigidity of the whole car body by providing a common mounting bracket to which the two-wheel shock absorber and the four-wheel shock absorber can be commonly mounted.

One aspect of the present invention is directed to a rear body structure of a vehicle including a wheel housing inner panel, a common mounting bracket engaged with an outer surface of the wheel housing inner panel in a fore/aft direction of the car body and having a pair of insertion holes formed therein dimensioned and configured to receive a two-wheel shock absorber and a four-wheel shock absorber, respectively, and/or an inner quarter connecting member connecting the common mounting bracket to an inner quarter panel to reinforce rigidity of the bracket.

The rear body structure may include an upper and lower reinforcing member integrally engaged with respective inner surfaces of a rear floor member, the wheel housing inner panel, the inner quarter panel and a roof inner panel.

The upper and lower reinforcing member may be mounted in a position where it intersects with the shared mounting bracket.

The upper and lower reinforcing member may be monolithically formed.

A spring seat may be provided on a bottom surface of a rear floor side member, and the rear body structure further may include a spring seat connecting member which connects the common mounting bracket to the spring seat to reinforce a rigidity of the bracket.

Another aspect of the present invention is directed to a rear body structure of a vehicle including a wheel housing inner panel, a common mounting bracket which may be engaged with an outer surface of the wheel housing inner panel in a fore/aft direction of the car body, and has a pair of insertion holes formed therein dimensioned and configured to receive a two-wheel shock absorber and a four-wheel shock absorber, respectively, and/or an upper and lower reinforcing member provided on and integrally engaged with respective inner surfaces of a rear floor member, the wheel housing inner panel, an inner quarter panel and a roof inner panel at a position where it intersects with the common mounting bracket.

A spring seat may be provided on a bottom surface of a rear floor side member, and the rear body structure further may include a spring seat connecting member which connects the common mounting bracket to the spring seat to reinforce a rigidity of the bracket.

The upper and lower reinforcing member may be monolithically formed.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
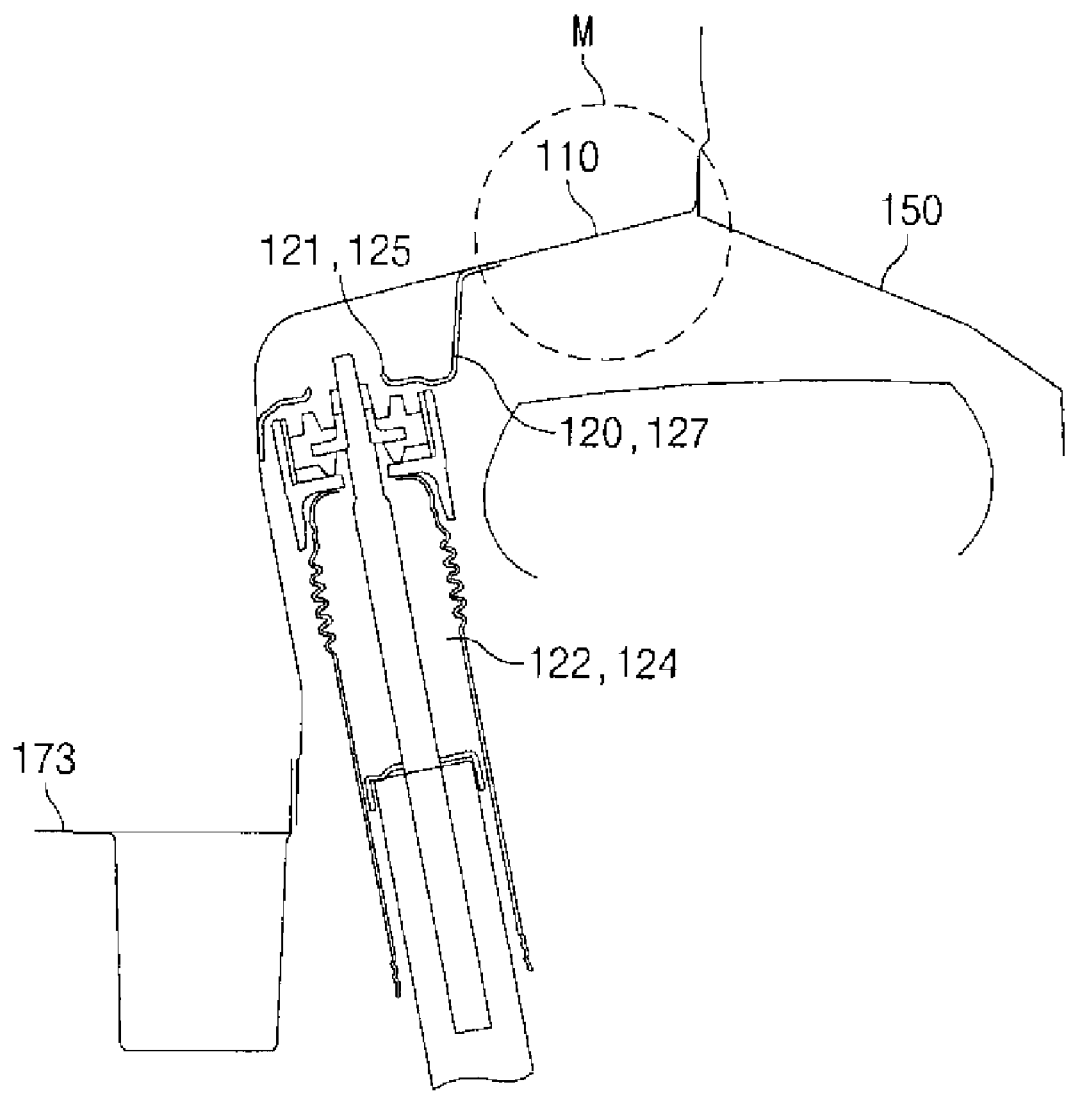
FIG. 1 is a cross-sectional view illustrating a conventional rear body structure of a vehicle.
Figure 2:
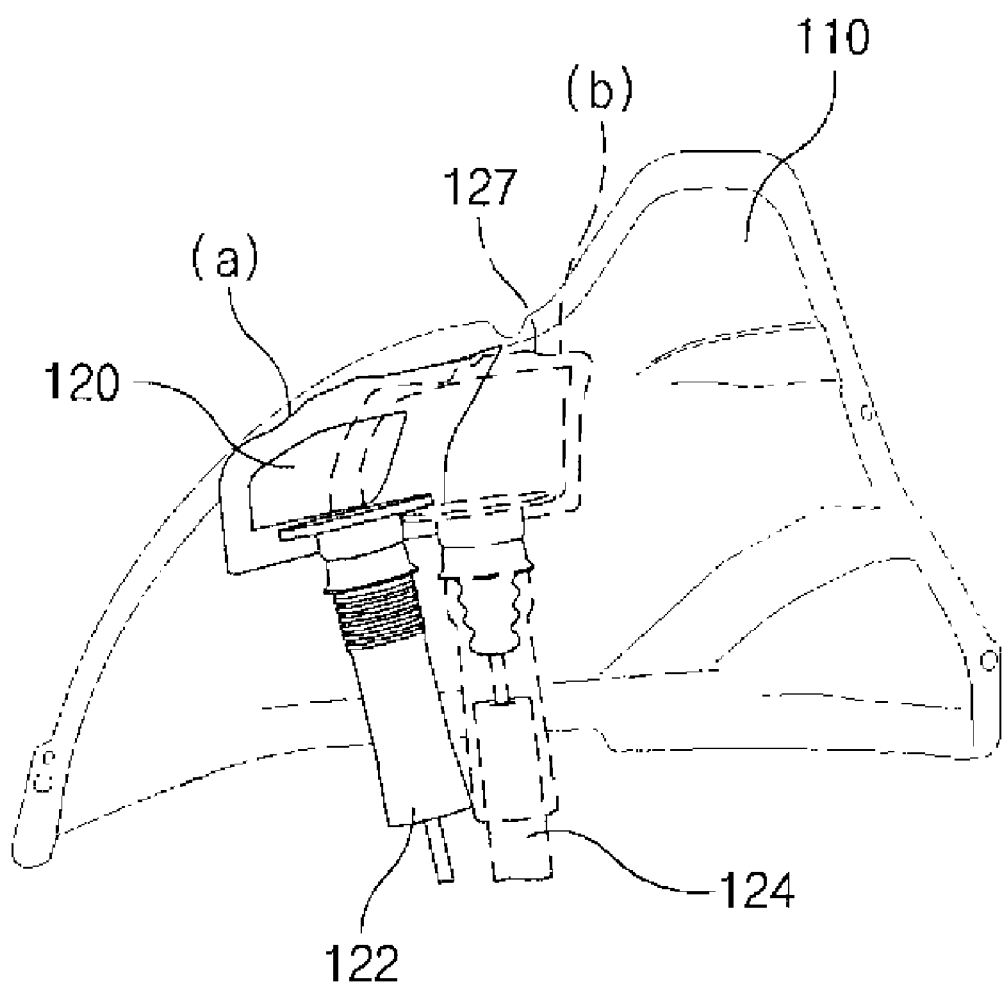
FIG. 2 is a perspective view illustrating a conventional rear body structure of a vehicle in which a two-wheel shock absorber and a four-wheel shock absorber are mounted on a mounting bracket for the two-wheel shock absorber and a mounting bracket for the four-wheel shock absorber, respectively.
Figure 3:
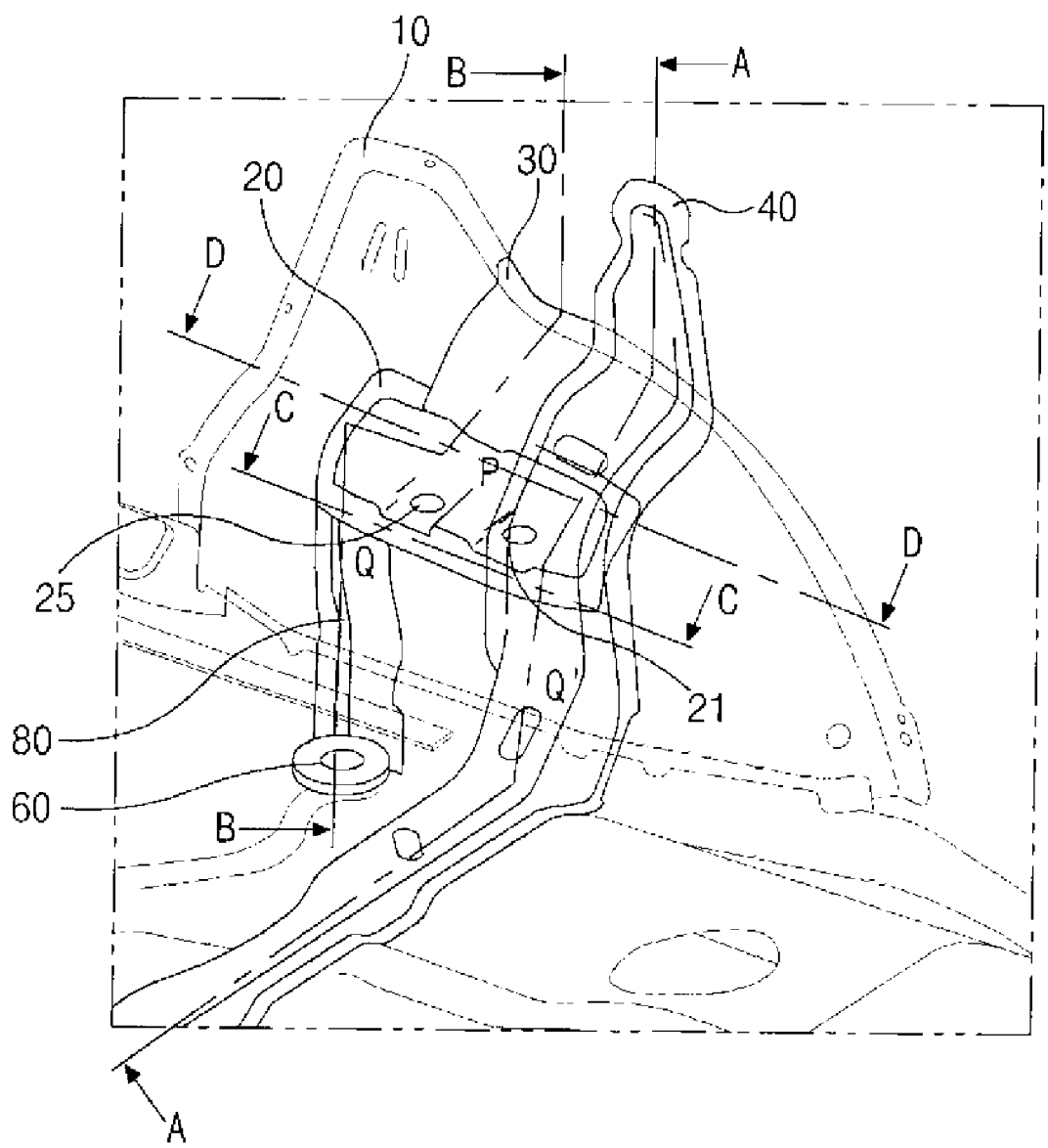
FIG. 3 is a perspective view illustrating an exemplary rear body structure of a vehicle according to the present invention.
Figure 4:
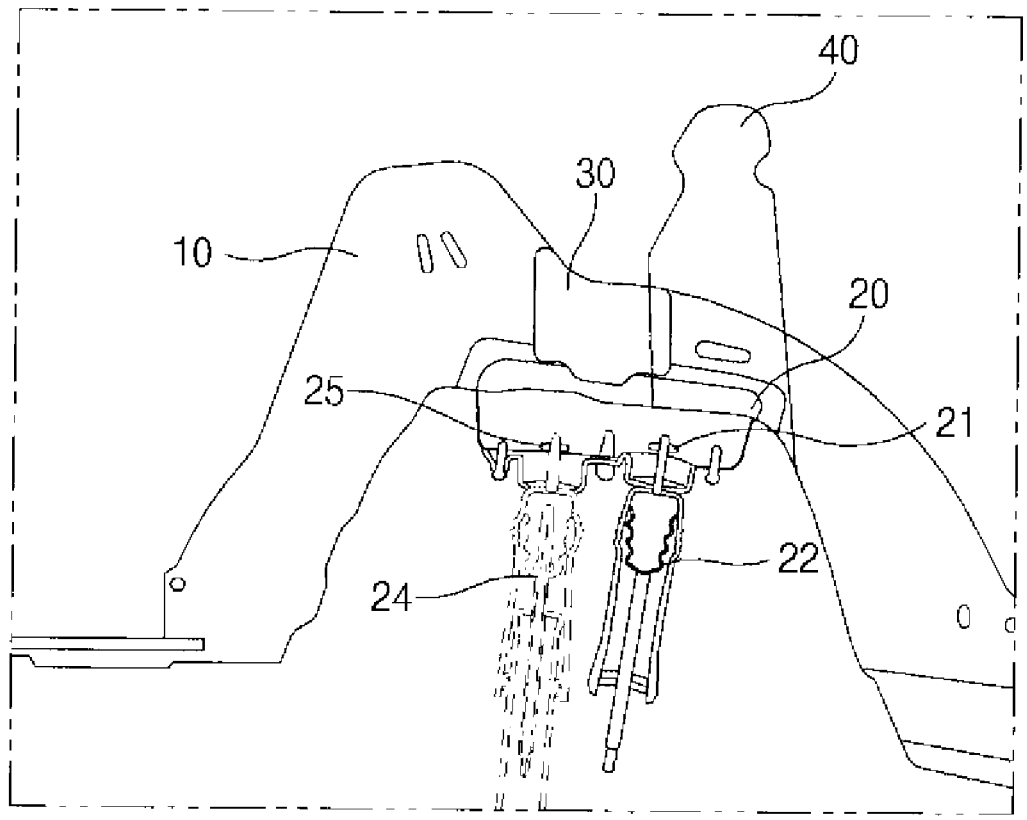
FIG. 4 is a cross-sectional view illustrating exemplary two-wheel and four-wheel shock absorbers respectively mounted on a common mounting bracket of FIG. 3.

FIG. 3 and FIG. 4 illustrate a rear body structure of a vehicle according to the present invention in which, for convenience of explanation, only its left hand (LH) is shown with its right hand (RH) omitted.

A rear body structure of vehicle according to the present invention includes, as shown in FIG. 3 and FIG. 4, a wheel housing inner panel 10, a common mounting bracket 20 which is engaged with an outer surface of the wheel housing inner panel 10 in a forward/backward direction P of the car body and to which a two-wheel shock absorber 22 and a four-wheel shock absorber 24 are commonly mounted, and an inner quarter connecting member 30 which connects the common mounting bracket 20 to an inner quarter panel 50 (refer to FIG. 5) to reinforce the rigidity of the bracket.

The common mounting bracket 20 is longitudinally engaged in a forward/backward direction P of the wheel housing inner panel 10, and thus serves to reinforce the rigidity of the car body in a forward/backward direction P.

In this case, insertion holes 21 and 25 are formed on a plate surface of the common mounting bracket 20, in which the insertion hole 21 is for inserting the two-wheel shock absorber 22 in case of a two-wheel drive system and the insertion hole 25 is for inserting the four-wheel shock absorber 24 in case of a four-wheel drive system.

As described above, according to the present invention, the single common mounting bracket 20 can be applied to a two-wheel drive system and a four-wheel drive system, without the need of separately manufacturing and assembling the bracket for a two-wheel shock absorber and the bracket for a four-wheel shock absorber, and thus it is possible to reduce the manufacturing cost.

In the conventional structure as described above, as for the two-wheel drive system and the four-wheel drive system, the mounting positions of the dedicated mounting brackets 120 and 127 are different from each other, and thus it is difficult to improve the structure to enhance the rigidity of the car body. However, according to the present invention, as the common mounting bracket 20 commonly applied to the two-wheel drive system and the four-wheel drive system is fixed to the wheel housing inner panel 10 without any change of its position, in formation of the structure for improving the rigidity of the car body through connection of the common mounting bracket 20 to the inner quarter panel 50, it is required to differentiate depending on whether the system is the two-wheel drive system or the four-wheel drive system. Thus, it is possible to provide a very effective structure.

Figure 5:
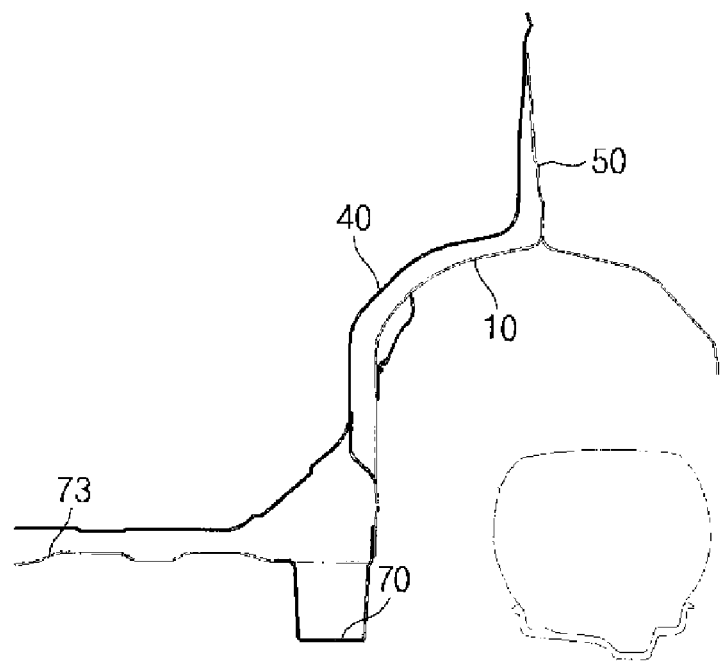
FIG. 5 is a cross-sectional view taken along line A-A of FIG. 3.
Figure 6:
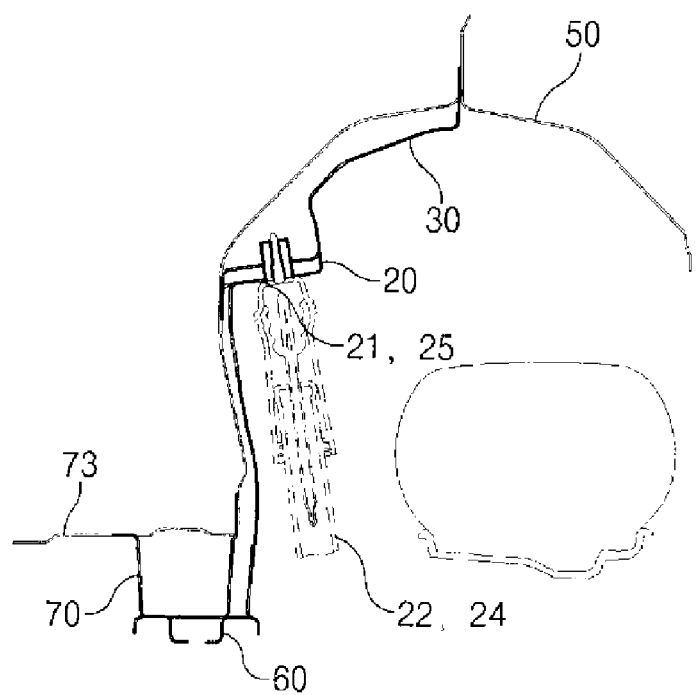
FIG. 6 is a cross-sectional view taken along line B-B of FIG. 3.
Figure 7:
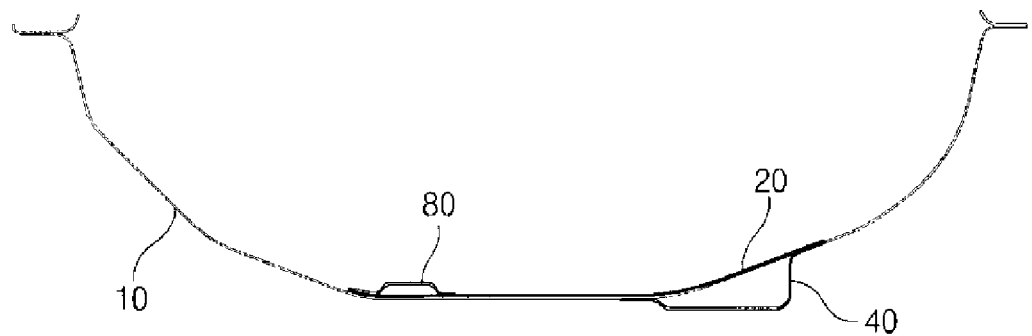
FIG. 7 is a cross-sectional view taken along line C-C of FIG. 3.
Figure 8:
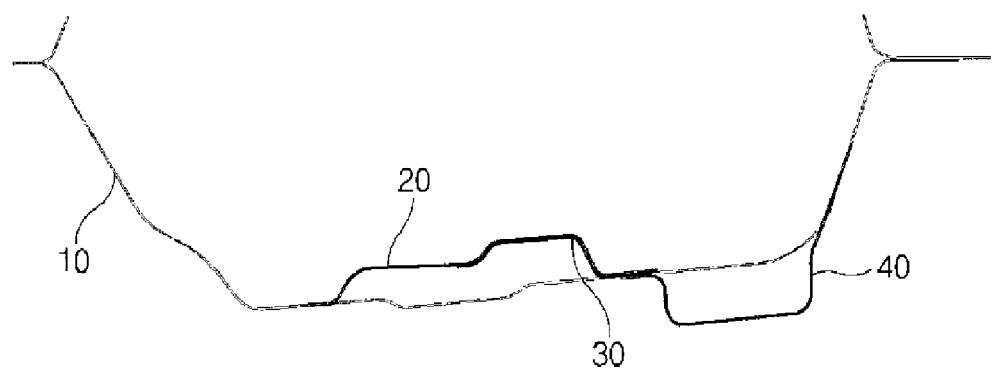
FIG. 8 is a cross-sectional view taken along line D-D of FIG. 3.

In this case, a member for connecting the common mounting bracket 20 to the inner quarter panel 50 includes an inner quarter connecting member 30 which is engaged with an outer surface of the wheel housing inner panel 10 at one end and engaged with the inner quarter panel 50 at the other end (see FIG. 6 and FIG. 8), and a upper and lower reinforcing member 40 integrally engaged with respective inner surfaces of a rear floor member 73, the wheel housing inner panel 10, the inner quarter panel 50 and a roof inner panel at its position intersecting with the common mounting bracket 20 (see FIG. 5 and FIG. 7). In this case, the common mounting bracket 20 is connected in an upward/downward direction Q by the inner quarter connecting member 30 and the upper and lower reinforcing member 40, and thus the rigidity in the upward/downward direction Q can be enhanced.

Here, the inner quarter connecting member 30 and the upper and lower reinforcing member 40 are all welded at engagement regions to form a single body together with the common mounting bracket 20.

The inner quarter connecting member 30 transfers the vibration, having been transferred to the common mounting bracket 20 upon applying a shock to the two-wheel shock absorber 22 or the four-wheel shock absorber 24, to the inner quarter panel 50, and thus serves to prevent noise and vibration from being introduced into a room of the vehicle.

Although the upper and lower reinforcing member 40 appears as if it was broken off as FIGS. 3 to 5 show only the light hand (LH) thereof, it is connected to the rear floor member 73, the wheel housing inner panel 10 of both sides RH and LH, the inner quarter panel 50 of both sides RH and LH, and the roof inner panel to form an annulus. Accordingly, the vibration having been transferred to the common mounting bracket 20 upon applying a shock to the shock absorber 22 or 24 can be dispersed overall the car body, and thus the noise and vibration being introduced into a room of vehicle can be reduced mostly.

Also, a spring seat 60 is provided on a bottom surface of a rear floor side member 70, in which the spring seat 60 is preferably connected to the common mounting bracket 20 by a spring seat connecting member 80. Thus, the spring connecting seat 80 can increase the rigidity of the car body in an upward/downward direction Q along with the inner quarter connecting member 30.

Accordingly, it is possible to effectively constitute the rear body structure for increasing the rigidity of the car body in forward/backward and upward/downward directions by applying the common mounting bracket 20 to which the two-wheel and four-wheel shock absorbers 22 and 24 can be mounted.

As described above, according to the rear body structure of a vehicle according to the present invention, a single common mounting bracket can be applied to a two-wheel drive system and a four-wheel drive system, without the need of separately manufacturing and assembling a bracket for a two-wheel shock absorber and a bracket for a four-wheel shock absorber, and thus the manufacturing cost of the rear body structure can be reduced.

Also, as the common mounting bracket commonly mounting to the two-wheel drive system and the four-wheel drive system is fixed to the wheel housing inner panel, in formation of the structure for improving the rigidity of the car body through connection of the common mounting bracket to the inner quarter panel, it is not required to differentiate depending on whether the system is the two-wheel drive system or the four-wheel drive system. Thus, it is possible to provide a very effective structure for improving the rigidity of the car body.

For convenience in explanation and accurate definition in the appended claims, the terms "upper" or "lower", "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A rear body structure of a vehicle, comprising:
   a wheel housing inner panel;
   a common mounting bracket engaged with an outer surface of the wheel housing inner panel in a fore/aft direction of the car body and having a pair of insertion holes formed therein dimensioned and configured to receive a two-wheel shock absorber and a four-wheel shock absorber, respectively;
   an inner quarter connecting member connecting the common mounting bracket to an inner quarter panel to reinforce rigidity of the bracket; and
   an upper and lower reinforcing member integrally engaged with respective inner surfaces of a rear floor member, the wheel housing inner panel, the inner quarter panel and a roof inner panel.

2. The rear body structure as claimed in claim 1, wherein the upper and lower reinforcing member is mounted in a position where it intersects with a shared mounting bracket.

3. The rear body structure as claimed in claim 1, wherein the upper and lower reinforcing member is monolithically formed.

4. The rear body structure as claimed in claim 1, wherein a spring seat is provided on a bottom surface of a rear floor side member, and the rear body structure further comprises a spring seat connecting member which connects the common mounting bracket to the spring seat to reinforce a rigidity of the bracket.

5. A rear body structure of a vehicle, comprising:
   a wheel housing inner panel;
   a common mounting bracket which is engaged with an outer surface of the wheel housing inner panel in a fore/aft direction of the car body, and has a pair of insertion holes formed therein dimensioned and configured to receive a two-wheel shock absorber and a four-wheel shock absorber, respectively; and
   an upper and lower reinforcing member provided on and integrally engaged with respective inner surfaces of a rear floor member, the wheel housing inner panel, an inner quarter panel and a roof inner panel at a position where it intersects with the common mounting bracket.

6. The rear body structure as claimed in claim 5, wherein a spring seat is provided on a bottom surface of a rear floor side member, and the rear body structure further comprises a spring seat connecting member which connects the common mounting bracket to the spring seat to reinforce a rigidity of the bracket.

7. The rear body structure as claimed in claim 5, wherein the upper and lower reinforcing member is monolithically formed.

* * * * *